United States Patent Office 2,773,764
Patented Dec. 11, 1956

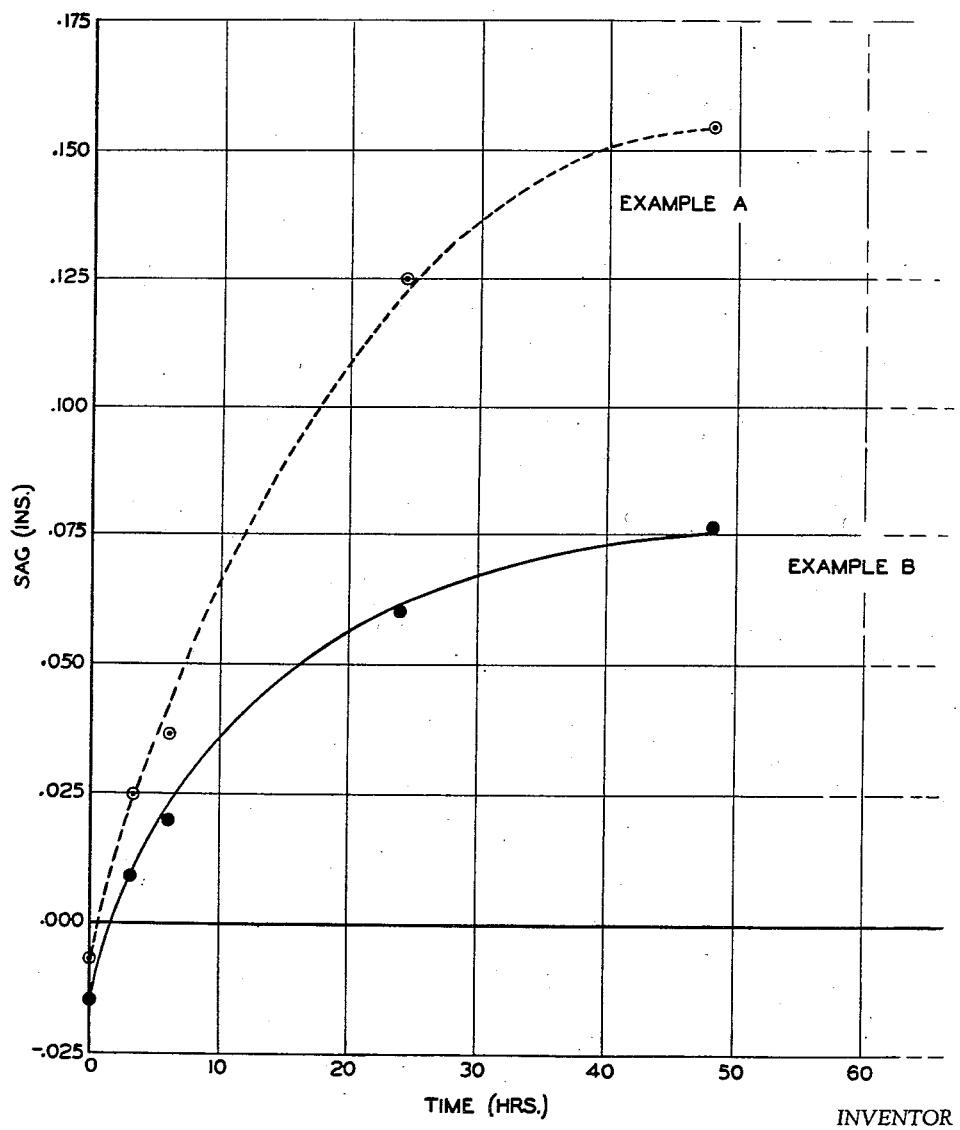

2,773,764

MINERAL FIBER PRODUCT

Arthur D. Park, Lancaster, Pa., assignor to Armstrong Cork Company, Lancaster, Pa., a corporation of Pennsylvania Application April 22, 1954, Serial No. 425,047

5 Claims. (Cl. 92—3)

The invention relates to a mineral fiber product and is concerned more particularly with the production of a mineral fiber acoustical board or unit.

In the manufacture of one type of mineral fiber acoustical board a slurry is prepared including pellets of nodulated mineral wool, an amylaceous binder, filler particles, and a waterproofing sizing material. This slurry is formed into a mat of the desired thickness by depositing the slurry onto a forming wire, between deckle straps, generally in accordance with conventional paper-making techniques. Water is withdrawn from the mat, and if desired the same may be fissured prior to passage into a heating chamber to activate the binder and dry the board. Subsequent to drying, the board is fabricated generally into units 12" x 12". The finished units are of predetermined thickness, ranging from about 5/8" to 1" or more. In some instances the product is provided with perforations instead of fissures, and this operation is effected by the use of drills or punches, as many as 500 or more perforations being simultaneously formed in a 12" x 12" unit. Where the product is to be installed on a suspended ceiling, for instance, the board may be provided with saw kerfs in its edges to receive the metal fastening units and splines. After such fabricating operations, the exposed face of the unit is generally coated with a decorative paint or other surface coating material. To be an efficient sound absorber the product must be open and porous, and with all of these various fabricating operations being performed on the product there are excessive fabrication losses.

An object of the present invention therefore is to provide a mineral fiber acoustical product possessing adequate sound-absorption characteristics and being capable of sustaining the various fabrication operations without excessive scrap losses.

Attempts to produce a sound-absorbing product having the desired structural characteristics to withstand multiple fabricating operations from a base of nodulated mineral wool, using larger quantities of binder materials, have failed in most instances because the addition of such larger proportions of binder to the nodulated mineral wool to provide the desired structural characteristics for economical fabrication have resulted in substantial reductions in other desirable characteristics of the finished product.

Another object of the invention therefore is to provide a mineral fiber acoustical product having a matrix of nodulated mineral fiber and a binder which imparts a high degree of structural strength to the finished product to permit rapid fabrication with conventional wood-working machines without excessive scrap loss and without loss of sound-absorption efficiency.

Another very important consideration in acoustical units, especially those which are fissured to a substantial depth, is to minimize sagging of the units, particularly when they are erected on suspended ceiling systems in which the units are supported by mechanical fasteners such as T runners and splines received within saw kerfs provided in the edges of the acoustical units. When high humidity conditions are encountered, as in a new building where the sound-absorbing units may be installed before the plastering is finished or possibly before all of the window and door openings have been cased-in, the high humidity conditions which may prevail for relatively long periods of hours within the building under such circumstances causes the amylaceous binder to soften and the units may sag of their own weight. An unsightly appearance of the ceiling surface results.

An additional object of the invention therefore is to provide a mineral fiber product including a modified amylaceous binder, which product is resistant to sagging.

Other objects of the invention will become apparent from consideration of the following, more detailed information concerning the invention.

I have found that the structural characteristics of an acoustical board made from nodulated mineral wool or the like with an amylaceous binder may be greatly enhanced by incorporating virgin kraft pulp as a minor component of the binder. The quantity employed has been found to be critical. If more than a relatively minor amount is added, there results a decrease in sound-absorption efficiency of the product wholly disproportionate to the change in the quantity of pulp added to the binder. Also, when more than a very small amount of the virgin kraft pulp is added, there is a substantial reduction in the rate at which water may be removed from the product. A third factor which is of importance deals with the formation of a product of uniform structural characteristics. Where more than a very limited amount of the virgin kraft pulp is added, it has been found that through some mechanism which is not fully understood the binder tends to be deposited on the outer surfaces of the granules or nodules of mineral wool and does not penetrate thereinto; and, as a result, the product is not uniform in structural characteristics.

According to the present invention there is incorporated with the nodulated, artifically formed mineral fiber, such as mineral wool or glass wool, an amylaceous binder, such as beater flour, pearl starch, or mixtures of the two, from 0.4 to 4% of virgin kraft pulp based on the total weight of the dry ingredients of the composition. The pulp should be well hydrated, and best results are obtained if the pulp is hydrated to a point where it has a 3-gram Canadian freeness of essentially zero or less. (The method of determining Canadian freeness is described in TAPPI Standard Specification T227–m50, as corrected October 1950.) An average Canadian 3-gram freeness of as much as 100 will impart improved structural characteristics to the board; but, as the freeness decreases, the improvement in structural characteristics increases, especially after the freeness drops to 10 or below. The virgin kraft pulp may be prepared in the conventional manner, using the sulphate process and treating either soft wood or hard wood. Preferably the wood furnish is reduced in lignin content to a point where it has a permanganate number of 24 or less, and it may be bleached if desired. Hydration conveniently may be effected in a Jordan engine or other equipment capable of reducing the kraft stock to the desired condition of hydration. (The method of determining permanganate number is set out in Bulletin R19 of the U. S. Department of Agriculture, entitled "Method for the Chemical Analysis of Pulps and Pulpwoods.")

In the following examples, Number I includes no kraft pulp while Examples II and III illustrate the invention and include varying amounts of the virgin kraft pulp. This provides a basis for comparison of the improved physical properties achieved by practice of the invention, such properties being set out in a chart which follows the examples.

Examples

|  | I | II | III |
|---|---|---|---|
| Nodulated Mineral Fiber | 960.00 | 960.00 | 960.00 |
| Virgin Kraft Pulp | 0.0 | 7.0 | 10.5 |
| Amylaceous Binder Material, e. g. Pearl Starch and Beater Flour | 165.0 | 165.0 | 160.0 |
| Wax Size | 13.0 | 13.0 | 13.0 |
| Finely Divided Filler Material | 480.0 | 480.0 | 480.0 |
| Percentage of Kraft in Mix | 0.0 | 0.43 | 0.65 |

NOTE.—All parts are by weight on a dry solids basis.

In the preparation of the material, the pearl starch may be mixed with water and heated to about 190° F. to gel the starch. The finely divided filler material, the beater flour, and the wax size may then be formed into a slurry and added to the gelled pearl starch mixture. The hydrated virgin kraft pulp diluted to the desired extent for convenient handling may be then incorporated with the other components and sufficient water added to provide a total batch of 960 gallons. To this batch is added 960 pounds of nodulated mineral wool or other nodulated mineral fiber material, such as nodulated glass wool or a mixture of both mineral wool and glass wool. This slurry is agitated to coat the fibers making up the nodules, and the product is then delivered to a forming machine, such as the conventional paper-forming wire previously mentioned to produce a mat of the desired thickness for subsequent fabrication into a product of the desired dimensions, e. g. 12" x 12" x 13/16". While the preferred binder consists essentially of amylaceous material, other binder ingredients may be employed in combination therewith. The finely divided filler material is preferably clay and the finely divided residue resulting from sawing, sanding, and other fabrication operations on the finished product of previous runs. Drying is accomplished by passing the mat as delivered from the forming machine through a heated oven. The mat is heated to about 190° F. in a humid atmosphere to convert the binder and is then heated to remove water and finally activate the binder. A temperature of 220–230° F. in the board is a good maximum to observe, it being recognized, of course, that the oven itself will be heated to a temperature well in excess of this in a portion of its heating zone.

In the above examples the kraft pulp was hydrated to a freeness of 10 or less and had a permanganate number of 24 or less, in accordance with the preferred practice of this invention. The artificially formed mineral fiber was a blast furnace slag wool.

The single figure of the drawing which is attached is a graph which illustrates the vast improvement in resistance to sagging which results from the incorporation of but about 0.65% of virgin kraft pulp into a nodulated mineral wool product. The curve which is in dotted line represents the sag of a control material made generally in accordance with Example I, but of lesser thickness and fissured. It contains no kraft pulp. (Example A on the graph.) The average sag at the center of a group of 12" x 12" x 11/16" test specimens, upon 24 hours' exposure in a conditioned room having a dry bulb temperature of 86° F. and a wet bulb temperature of 83° F. with relative humidity of 88%, was .125" and after 48 hours' exposure, was over .150". Contrasted with this, specimens of the same dimensions made with a furnish the same as Example A but containing 0.65% of virgin kraft pulp (Example B on the graph) had an average sag upon 24 hours' exposure of about .060", less than one half that of the control material, and at 48 hours' exposure an average sag of about .076", still slightly less than one half the average sag of the control specimens.

The sag tests were made by suspending test specimens from their edges with metal fasteners, the specimens being held in a horizontal position, as normally arranged when the material is erected on a suspended ceiling. Test specimens were held along the two edges which lie generally parallel to the direction of the fissuring, and an equal number of test specimens were held along the two edges which are generally normal or at right angles to the direction of the fissures. An average of the sag of the two groups of specimens was taken as the average sag of the material under test.

It is unobvious that the addition of such a minor quantity of virgin kraft pulp (0.65% in the tests reported above) should double the sag resistance of a mineral fiber product, and the mechanism which is involved is not understood.

In addition to this vast increase in sag resistance, the product of the invention is also improved in handleability which means that the various fabrication operations may be preformed on the units without excessive scrap loss. Actual commercial production of the material of the invention has shown reductions in scrap loss as great as 50%. It is difficult to establish this improved property by conventional tests of physical properties of the finished product; actual commercial experience in manufacture where noticeable scrap losses may be observed is much more convincing. Nevertheless, the following chart shows some of the physical characteristics which contribute to the attainment of good handleability and a concomitant reduction in scrap losses.

| Examples | Av. Density (lbs./bd. ft.) | Av. Modulus of Rupture (lbs./sq. in.) | Percent Wt. Lost During Abrasion |
|---|---|---|---|
| I | 1.80 | 100 | 11.5 |
| II | 1.84 | 124 | 9.6 |
| III | 1.88 | 128 | 9.0 |

It will be noted that Example II which contains .43% of virgin kraft pulp on the basis of the total dry solids weight of the entire composition has a somewhat higher average modulus of rupture than Example I which is the "control" composition which contains no virgin kraft pulp. Example III which includes 0.65% of virgin kraft pulp has a modulus of rupture which is higher than either Examples I or II.

The percentage of weight lost during this abrasion test indicates that the material made in accordance with the invention is "tougher" than the control material. This abrasion test is one of a standard type which is performed by rumbling twelve cubes of the finished material 13/16" cubes in this test) in an oak box having inside dimensions of 7¾" x 7¾" x 7½", the box being rotated about a longitudinal axis at a rate of 60 revolutions per minute for 5 minutes. It will be noted from the chart above that the control composition lost 11½% during this abrasion test; whereas, the composition of Example III lost 9%.

By this invention employing from 0.4% to 4.0% virgin kraft pulp the sag resistance of nodulated mineral fiber acoustical materials bonded with amylaceous binders has been markedly improved, and at the same time the scrap losses occasioned in multiple fabricating operations such as cutting to size, kerfing, beveling, and sanding have been reduced without any substantial increase in raw materials cost. Sound-absorption efficiency has not been impaired, and speed of water removal and drying have not been increased measurably.

This application in its disclosure of the use of hydrated kraft pulp having a Canadian 3-gram freeness of 10 or less and a permanganate number of 24 or less is related to the copending application of Wylmer L. Scott, filed April 22, 1954, Serial No. 425,046, where the preparation of such pulp is more fully disclosed. As mentioned previously, however, the present invention is not limited to the use of such stock, although it is preferred.

I claim:

1. A self-sustaining acoustical board comprising nodulated, artificially formed mineral fibers, an amylaceous binder for the fibers, mineral filler, and as an agent for reducing the tendency of the material to sag under conditions of high humidity 0.4% to 4.0% based on the total weight of the material of hydrated virgin kraft pulp.

2. A self-sustaining acoustical board comprising nodulated, artificially formed mineral fibers, a starch binder for the fibers, mineral filler, and as an agent for reducing the tendency of the material to sag under conditions of high humidity 0.4% to 4.0% based on the total weight of the material of virgin kraft pulp hydrated to a maximum average Canadian 3-gram freeness of 100.

3. A self-sustaining acoustical board comprising nodulated, artificially formed mineral fibers, an amylaceous binder for the fibers, mineral filler, and as an agent for reducing the tendency of the material to sag under conditions of high humidity a small but effective amount, up to about 4% based on the total weight of the material, of hydrated virgin kraft pulp.

4. A self-sustaining acoustical board comprising nodulated, artificially formed mineral fibers, an amylaceous binder for the fibers, mineral filler, and as an agent for reducing the tendency of the material to sag under conditions of high humidity a small but effective amount, up to about 4% based on the total weight of the material, of hydrated virgin kraft pulp hydrated to a maximum average Canadian 3-gram freeness of 10.

5. A self-sustaining acoustical board comprising nodulated, artificially formed mineral fibers, an amylaceous binder for the fibers, mineral filler, a waterproofing size, and as an agent for reducing the tendency of the material to sag under conditions of high humidity a small but effective amount, up to about 4% based on the total weight of the material, of hydrated virgin kraft pulp.

References Cited in the file of this patent

UNITED STATES PATENTS

| | | |
|---|---|---|
| 1,910,469 | Kitsee | May 23, 1933 |
| 1,972,493 | Powell | Sept. 4, 1934 |
| 2,504,744 | Sproull et al. | Apr. 18, 1950 |
| 2,633,433 | Hollenberg | Mar. 31, 1953 |